United States Patent
Ishikawa et al.

(10) Patent No.: US 8,504,293 B2
(45) Date of Patent: Aug. 6, 2013

(54) TRAVEL GUIDING APPARATUS FOR VEHICLE, TRAVEL GUIDING METHOD FOR VEHICLE, AND COMPUTER-READABLE STORAGE MEDIUM

(75) Inventors: Tomoaki Ishikawa, Okazaki (JP);
Masaki Nakamura, Okazaki (JP);
Masao Maura, Seto (JP)

(73) Assignee: Aisin AW Co., Ltd., Anjo (JP)

( * ) Notice: Subject to any disclaimer, the term of this patent is extended or adjusted under 35 U.S.C. 154(b) by 265 days.

(21) Appl. No.: 12/911,258

(22) Filed: Oct. 25, 2010

(65) Prior Publication Data

US 2011/0144907 A1    Jun. 16, 2011

(30) Foreign Application Priority Data

Dec. 10, 2009  (JP) .................................. 2009-280766

(51) Int. Cl.
*G01S 13/88* (2006.01)
(52) U.S. Cl.
USPC ............. 701/514; 701/28; 701/117; 701/301; 701/523; 701/532; 340/425.5; 340/933; 340/937
(58) Field of Classification Search
None
See application file for complete search history.

(56) References Cited

U.S. PATENT DOCUMENTS

| | | | | |
|---|---|---|---|---|
| 5,612,882 A * | 3/1997 | LeFebvre et al. | ............. | 701/423 |
| 6,223,117 B1 * | 4/2001 | Labuhn et al. | .................. | 701/93 |
| 6,438,472 B1 * | 8/2002 | Tano et al. | ................... | 701/29.6 |
| 6,449,572 B1 * | 9/2002 | Kurz et al. | ....................... | 702/94 |
| 6,459,387 B1 * | 10/2002 | Kobayashi et al. | ........... | 340/988 |
| 6,675,081 B2 * | 1/2004 | Shuman et al. | ................. | 701/48 |
| 6,711,493 B1 * | 3/2004 | Andrews et al. | ............... | 701/117 |
| 6,873,911 B2 * | 3/2005 | Nishira et al. | ................ | 701/301 |
| 7,382,274 B1 * | 6/2008 | Kermani et al. | .............. | 340/901 |
| 7,444,311 B2 * | 10/2008 | Engstrom et al. | ............... | 706/20 |
| 7,765,058 B2 * | 7/2010 | Doering | ........................ | 701/123 |
| 7,809,487 B2 * | 10/2010 | Syed et al. | ...................... | 701/70 |
| 8,112,222 B2 * | 2/2012 | Nakao et al. | .................. | 701/300 |
| 2002/0091473 A1 * | 7/2002 | Gardner et al. | ................. | 701/35 |

(Continued)

FOREIGN PATENT DOCUMENTS

| | | |
|---|---|---|
| JP | A-2001-289651 | 10/2001 |
| JP | A-2001-330443 | 11/2001 |

(Continued)

OTHER PUBLICATIONS

Feb. 6, 2012 European Search Report issued in EP 10 19 0430.

(Continued)

*Primary Examiner* — Khoi Tran
*Assistant Examiner* — Jonathan L Sample
(74) *Attorney, Agent, or Firm* — Oliff & Berridge, PLC

(57) ABSTRACT

A travel guiding apparatus, method, and program for a vehicle store map information and marker pattern identification information used to identify a marker pattern for each road type, wherein the marker pattern is a pattern of a marker included in a lane marking. The apparatus, method, and program determine a type of road on which the vehicle is traveling and detect the maker pattern on the road. The apparatus, method, and program again determine the type of the road based on the detected marker pattern and change the type of determined road from a road other than an expressway to an expressway, if the first detected type of road is a road other than an expressway and the type of road detected based on the marker pattern is an expressway.

7 Claims, 6 Drawing Sheets

U.S. PATENT DOCUMENTS

| | | | |
|---|---|---|---|
| 2003/0065432 A1* | 4/2003 | Shuman et al. | 701/48 |
| 2004/0243301 A1* | 12/2004 | Kim | 701/201 |
| 2004/0252027 A1* | 12/2004 | Torkkola et al. | 340/576 |
| 2005/0131597 A1* | 6/2005 | Raz et al. | 701/29 |
| 2005/0159851 A1* | 7/2005 | Engstrom et al. | 701/1 |
| 2005/0228578 A1* | 10/2005 | Burzio | 701/117 |
| 2005/0256635 A1* | 11/2005 | Gardner et al. | 701/201 |
| 2006/0195231 A1* | 8/2006 | Diebold et al. | 701/1 |
| 2007/0112500 A1* | 5/2007 | Ogawa | 701/96 |
| 2008/0077322 A1 | 3/2008 | Sumizawa | |
| 2008/0120175 A1* | 5/2008 | Doering | 705/14 |
| 2008/0208460 A1* | 8/2008 | Nakao et al. | 701/208 |
| 2008/0275618 A1* | 11/2008 | Grimm et al. | 701/96 |
| 2009/0088978 A1* | 4/2009 | Ishikawa et al. | 701/223 |
| 2009/0138193 A1* | 5/2009 | Katou | 701/201 |
| 2009/0174577 A1* | 7/2009 | Nakamura et al. | 340/995.1 |
| 2009/0271101 A1* | 10/2009 | Relyea et al. | 701/118 |
| 2010/0088024 A1* | 4/2010 | Takahara et al. | 701/208 |
| 2010/0161192 A1* | 6/2010 | Nara et al. | 701/70 |
| 2010/0201816 A1* | 8/2010 | Lee et al. | 348/148 |
| 2011/0144907 A1* | 6/2011 | Ishikawa et al. | 701/208 |

FOREIGN PATENT DOCUMENTS

| | | |
|---|---|---|
| JP | A-2005-055192 | 3/2005 |
| JP | A-2005-114535 | 4/2005 |
| JP | A-2005-292052 | 10/2005 |
| WO | WO 2008/146949 A1 | 12/2008 |

OTHER PUBLICATIONS

Japanese Patent Office, Notification of Reason(s) for Refusal mailed on May 14, 2013 in Japanese Patent Application No. 2009-280766 w/Partial English-language Translation.

* cited by examiner

WHITE-LINE PATTERN

| EXPRESSWAY | ROAD OTHER THAN EXPRESSWAY |
|---|---|
| 20m<br>8m  12m | 20m<br>6m  9m |

TRAVEL GUIDING APPARATUS FOR VEHICLE, TRAVEL GUIDING METHOD FOR VEHICLE, AND COMPUTER-READABLE STORAGE MEDIUM

INCORPORATION BY REFERENCE

The disclosure of Japanese Patent Application No. 2009-280766 filed on Dec. 10, 2009 including the specification, drawings and abstract is incorporated herein by reference in its entirety.

BACKGROUND OF THE INVENTION

1. Field of the Invention

The invention relates to a travel guiding apparatus for a vehicle and a travel guiding method for a vehicle, which determine the type of a road on which a vehicle is traveling, and a computer-readable storage medium that stores computer-executable instructions for performing the method.

2. Description of the Related Art

Recently, vehicles have been provided with navigation apparatuses that provide guidance regarding the travel of the vehicles so that drivers easily reach desired destinations. In the navigation apparatus, the current position of the vehicle is detected using a GPS receiver or the like, map information regarding the current position is acquired through a storage medium such as a DVD-ROM or a HDD, or through a network, and a map image regarding an area around the vehicle is displayed on a liquid crystal monitor. Further, a road on which the vehicle is currently traveling (hereinafter, the road on which the vehicle is traveling may be referred to as "a vehicle traveling road") is indicated on the displayed map image. When the vehicle traveling road is determined based on the current position of the vehicle and the map information, the vehicle traveling road may not be accurately determined.

That is, when the vehicle is traveling in a region in which an elevated expressway is located above an ordinary road or an elevated ordinary road is located above an expressway, or an expressway extends in parallel with an ordinary road, the navigation apparatus cannot accurately determine on which of the expressway and the ordinary road the vehicle is traveling. As a result, the navigation apparatus may determine and indicate that the vehicle is currently traveling on a road that is different from a road on which the vehicle is actually traveling. Thus, Japanese Patent Application Publication No. 2001-289651 (JP-A-2001-289651) (refer to pages 5 and 6 and FIG. 3) describes a navigation apparatus including a camera that captures the image of the surface of a vehicle traveling road. In the navigation apparatus, the length of a white-line interval relating to white lines included in a lane marking on the vehicle traveling road is measured based on the image captured by the camera. One lane marking is composed of a plurality of white lines. The white-line interval is a distance from the starting end of one white line to the starting end of another white line. Then, it is determined whether the vehicle traveling road is an expressway or an ordinary road, based on the measured length of the white-line interval.

SUMMARY OF THE INVENTION

However, in the navigation apparatus described in the publication 2001-289651, because the road type is determined based on only the measured white-line interval, an erroneous determination may be made. Hereinafter, the reason why an erroneous determination may be made will be described based on an example. FIG. 6 is a diagram showing stipulated white-line intervals for respective road types in Japan. As shown in FIG. 6, the length of the white line for an expressway is stipulated to be 8 m and the length of a blank between the white lines for an expressway is stipulated to be 12 m in Japan. Thus, the white-line interval for an expressway is 20 m. In contrast, the length of the white line for a road other than an expressway (for example, for an ordinary road) may be stipulated to be 6 m, and the length of the blank between the white lines for a road other than an expressway (for example, for an ordinary road) may be stipulated to be 9 m in Japan. In this case, the white-line interval is 15 m.

In the navigation apparatus described in the publication No. 2001-289651, if the length of the white line has become shorter than the original length or a part of the white line cannot be detected by the camera due to, for example, deterioration of paint, the measured white-line interval may be shorter than the original white-line interval. FIG. 7 shows a case where a vehicle 101 is traveling on an expressway on which white lines 102 to 104 are drawn as a lane marking. In this case, if part of paint of the white line 102 has deteriorated and cannot be detected by the camera, the white-line interval is erroneously detected to be 15 m although the actual white-line interval is 20 m. As a result, there is a possibility that an erroneous determination that the vehicle is traveling on a road other than an expressway is made, although the vehicle is actually traveling on an expressway.

The invention provides a travel guiding apparatus for a vehicle and a travel guiding method for a vehicle, which make it possible to reduce the possibility that an erroneous determination that a vehicle is traveling on a road other than an expressway is made although the vehicle is traveling on an expressway, and to change the result of a determination as to the type of a vehicle traveling road on which the vehicle is traveling to an accurate determination result, based on a detected marker pattern that is the pattern of a marker included in a lane marking, for example, a white-line pattern, and the invention provides a computer-readable storage medium that stores computer-executable instructions for performing the method.

A first aspect of the invention relates to a travel guiding apparatus for a vehicle. The apparatus includes a storage unit that stores map information and marker pattern identification information used to identify a marker pattern for each road type, wherein the marker pattern is a pattern of a marker included in a lane marking; a first road type determination unit that determines a type of a vehicle traveling road on which a vehicle is traveling, based on a current position of the vehicle and the map information; a marker pattern detection unit that detects the maker pattern on the vehicle traveling road;

a second road type determination unit that determines the type of the vehicle traveling road, based on the marker pattern detected by the marker pattern detection unit and the marker pattern identification information; and a road type change unit that changes the type of the vehicle traveling road determined by the first road type determination unit from a road other than an expressway to an expressway, if the first road type determination unit determines that the type of the vehicle traveling road is a road other than an expressway, and the second road type determination unit determines that the type of the vehicle traveling road is an expressway.

With the travel guiding apparatus for a vehicle according to the first aspect of the invention, it is possible to reduce the possibility that the erroneous determination that the vehicle is traveling on a road other than an expressway is made although the vehicle is traveling on an expressway, and to change the result of the determination as to the type of the vehicle traveling road to the accurate determination result, based on the detected marker pattern. Accordingly, it is possible to improve the reliability of the result of the road type determination.

Also, a second aspect of the invention relates to a travel guiding method for a vehicle. The method includes performing a first road type determination that determines a type of a vehicle traveling road on which a vehicle is traveling, based on a current position of the vehicle and map information stored in a storage unit; detecting a maker pattern that is a pattern of a marker included in a lane marking on the vehicle traveling road; performing a second road type determination that determines the type of the vehicle traveling road, based on the detected marker pattern and marker pattern identification information stored in the storage unit, wherein the marker pattern identification information is used to identify the marker pattern for each road type; and changing the type of the vehicle traveling road determined by the first road type determination from a road other than an expressway to an expressway, if it is determined that the type of the vehicle traveling road is a road other than an expressway by the first road type determination, and it is determined that the type of the vehicle traveling road is an expressway by the second road type determination.

According to the travel guiding method for a vehicle according to the second aspect of the invention, it is possible to reduce the possibility that the erroneous determination that the vehicle is traveling on a road other than an expressway is made although the vehicle is traveling on an expressway, and to change the result of the determination as to the type of the vehicle traveling road to the accurate determination result, based on the detected marker pattern. Accordingly, it is possible to improve the reliability of the result of the road type determination.

Further, a third aspect of the invention relates to a computer-readable storage medium that stores computer-executable instructions for performing a travel guiding method for a vehicle. The method includes performing a first road type determination that determines a type of a vehicle traveling road on which a vehicle is traveling, based on a current position of the vehicle and map information stored in a storage unit; detecting a maker pattern that is a pattern of a marker included in a lane marking on the vehicle traveling road; performing a second road type determination that determines the type of the vehicle traveling road, based on the detected marker pattern and marker pattern identification information stored in the storage unit, wherein the marker pattern identification information is used to identify the marker pattern for each road type; and changing the type of the vehicle traveling road determined by the first road type determination from a road other than an expressway to an expressway, if it is determined that the type of the vehicle traveling road is a road other than an expressway by the first road type determination, and it is determined that the type of the vehicle traveling road is an expressway by the second road type determination.

With the storage medium according to the third aspect of the invention, it is possible to reduce the possibility that the erroneous determination that the vehicle is traveling on a road other than an expressway is made although the vehicle is traveling on an expressway, and to change the result of the determination as to the type of the vehicle traveling road to the accurate determination result, based on the detected marker pattern. Accordingly, it is possible to improve the reliability of the result of the road type determination.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Figure 1:
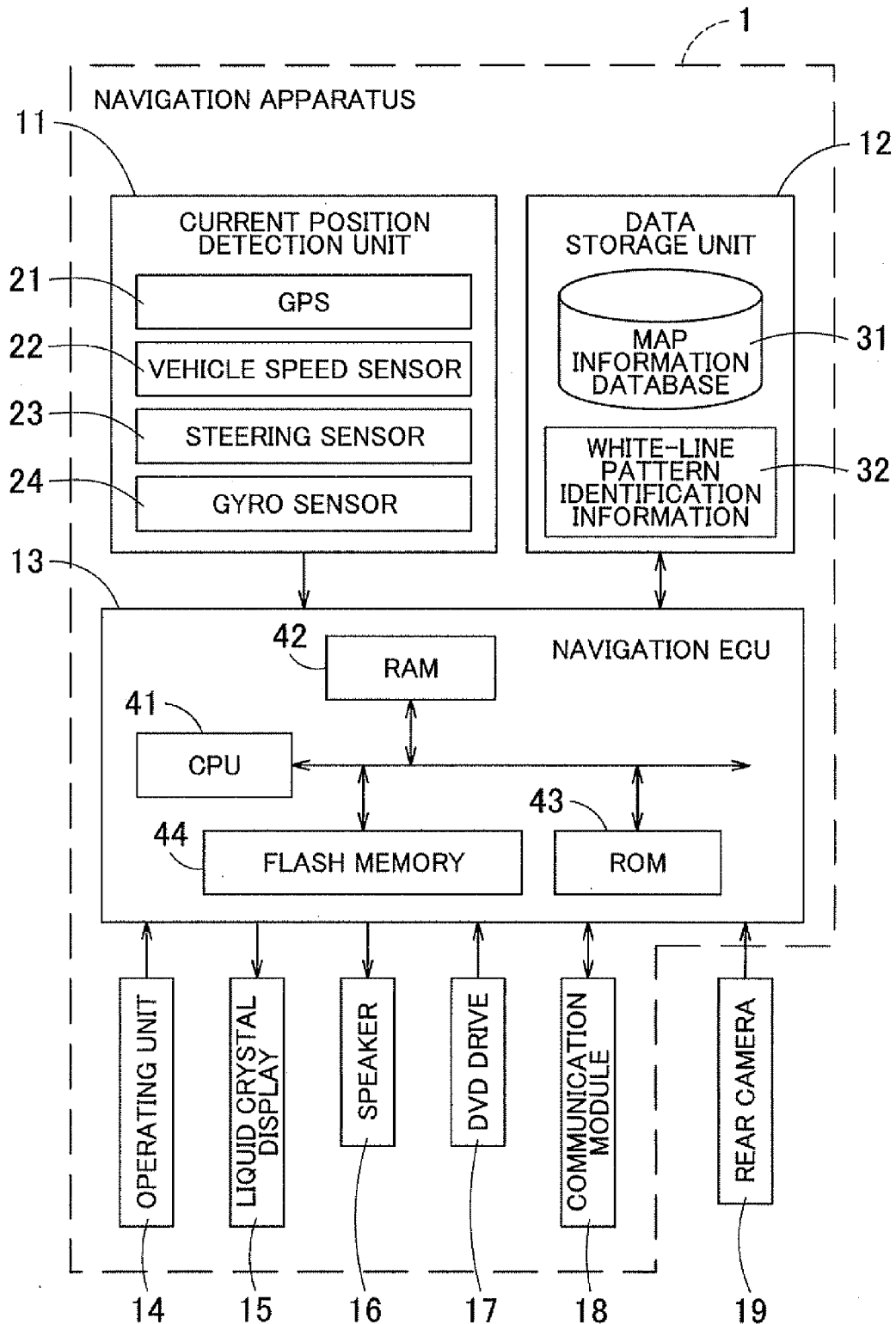
FIG. 1 is a block diagram showing a navigation apparatus according to an embodiment.

Hereinafter, a travel guiding apparatus for a vehicle according to the invention will be described in detail based on an embodiment where the travel guiding apparatus according to the invention is embodied as a navigation apparatus, with reference to the drawings. First, a schematic configuration of a navigation apparatus 1 according to the embodiment will be described with reference to FIG. 1. FIG. 1 is a block diagram showing the navigation apparatus 1 according to the embodiment.

As shown in FIG. 1, the navigation apparatus 1 according to the embodiment includes a current position detection unit 11 that detects the current position of a vehicle; a data storage unit 12 that stores various data; a navigation electronic control unit (ECU) 13 that performs various computations based on information input to the navigation ECU 13; an operating unit 14 that receives an operation performed by a user; a liquid crystal display 15 that displays a map or a guiding route to a destination, to a user; a speaker 16 that outputs voice guidance regarding route guidance; a DVD drive 17 that reads a DVD that is one of storage media that store programs; and a communication module 18 that communicates with an information center such as a traffic information center. Also, the navigation apparatus 1 is connected to a rear camera 19 that detects the pattern of white lines included in a lane marking described later.

Hereinafter, constituent elements of the navigation apparatus 1 will be sequentially described. The current position detection unit 11 includes a GPS 21, a vehicle speed sensor 22, a steering sensor 23, a gyro sensor 24, and an altimeter (not shown). The current position detection unit 11 detects the current position, current orientation, current traveling speed, and the like of the vehicle. In this case, particularly, the vehicle speed sensor 22 is a sensor that detects the moving distance and traveling speed of the vehicle. The vehicle speed sensor 22 generates pulses in accordance with the rotation of the wheel of the vehicle, and outputs pulse signals to the navigation ECU 13. The navigation ECU 13 calculates the rotational speed of the wheel, and the moving distance of the vehicle by counting the number of the pulses generated by the vehicle speed sensor 22. The navigation apparatus 1 need not necessarily include all of the above-described four sensors. The navigation apparatus 1 may include only one or some of the above-described sensors.

Also, the data storage unit 12 includes a hard disk (not shown) that functions as an external storage device and a storage medium; and a read/write head (not shown) that reads out a map information database 31, white-line pattern identification information 32, a predetermined program, and the like, and writes predetermined data in the hard disk.

The map information database 31 stores various map data required to provide the route guidance and the traffic information, and to display a map. More specifically, the map data includes link data regarding a road configuration (i.e., a link configuration); node data regarding node points; Points of Interest (POI) data that is information regarding locations of facilities and the like; intersection data regarding each intersection; retrieval data used to retrieve routes; search data used to search for locations; and image drawing data used to draw images of a map, roads, traffic information, and the like on the liquid crystal display 15. Particularly, as the link data, information regarding road types of links is stored. The road type includes an automobile expressway, an urban expressway, a freeway, an ordinary tollway, and an ordinary road. The map information database 31 is updated based on updating data delivered by a map delivery center or the like, or updating data provided through a storage medium (for example, a DVD or a memory card).

Figures 5, 6:
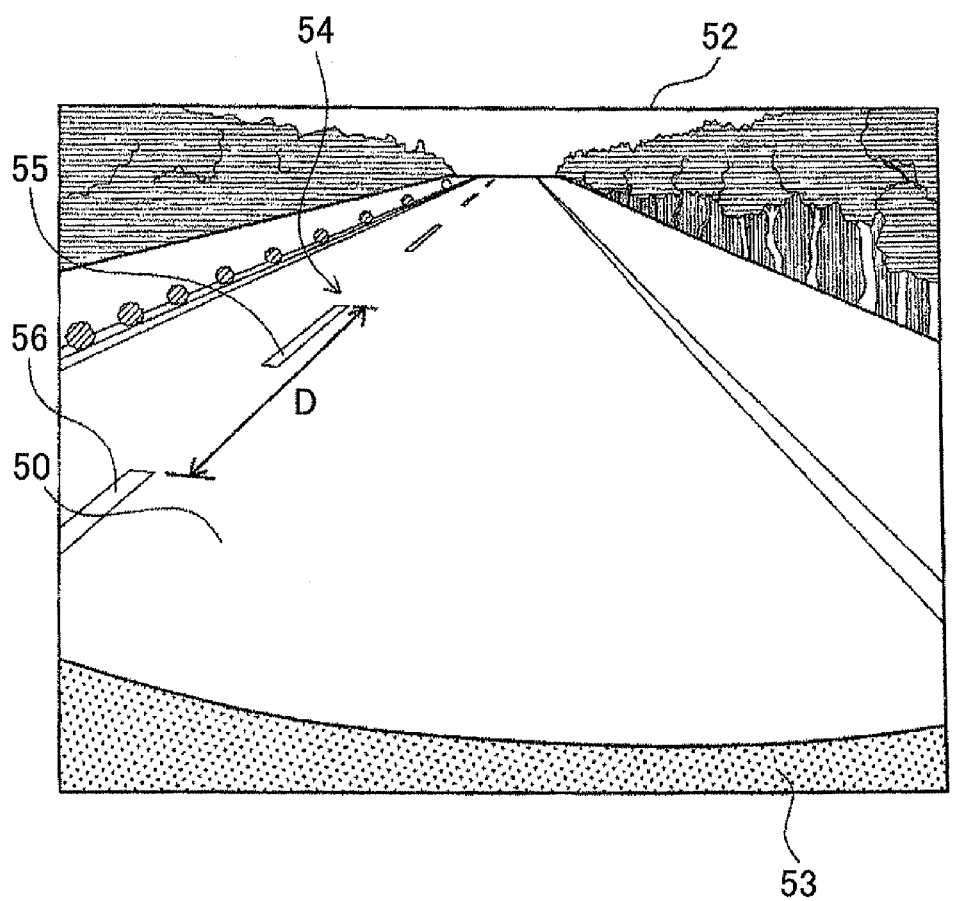
FIG. 5 is a schematic diagram showing an image captured by a rear camera of the vehicle that is traveling on the road with two lanes each way.
FIG. 6 is a diagram showing stipulated white-line patterns in lane markings for an expressway and a road other than an expressway.
Figure 7:
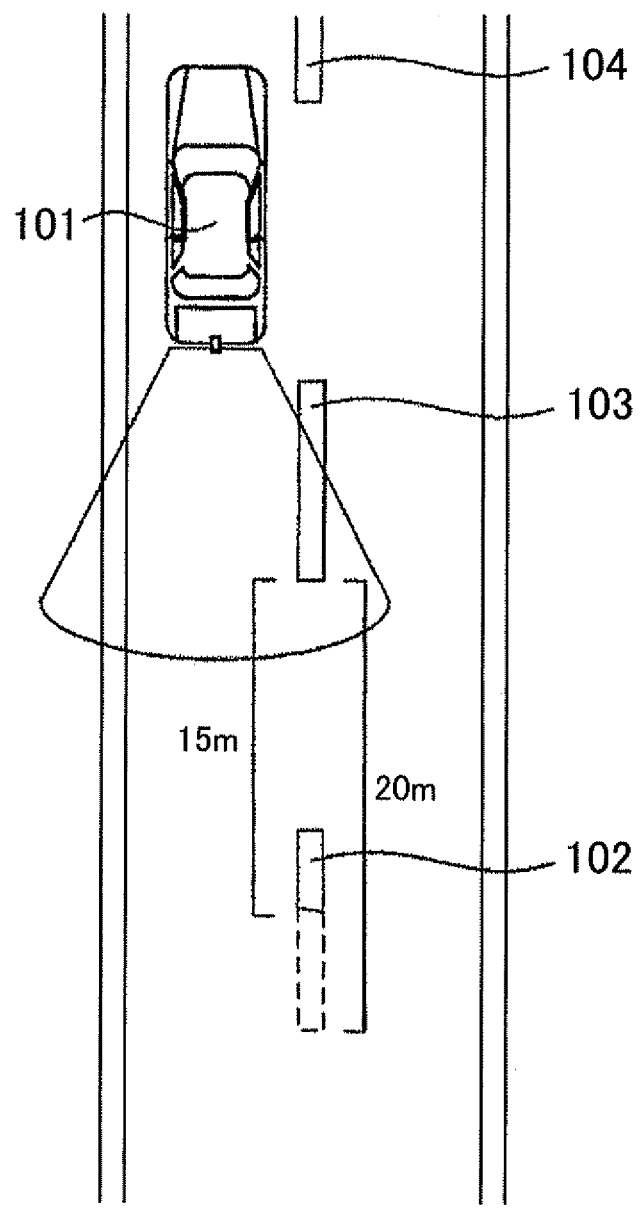
FIG. 7 is a diagram showing a problem that may occur in related art.

The white-line pattern identification information 32 is used to identify a white-line pattern for each road type. The white-line pattern is the pattern of a white line that are one example of a marker included in the lane marking. The term "white-line pattern" signifies, for example, the length of the white line, the length of a blank between the white lines, or the sum of the length of the white line and the length of the blank adjacent to the white line. The white-line pattern identification information 32 includes, for example, the length of the white line for each road type, the length of the blank between the white lines for each road type, and the sum of the length of the white line for each road type and the length of the blank adjacent to the white line for the road type in a direction in which the vehicle is traveling for each road type, as shown in FIG. 6.

The navigation ECU 13 is an electronic control unit that executes controls of the entire navigation apparatus 1 to perform a guiding route setting process that sets a guiding route from the current position to a destination when the destination is selected; a first road type determination process that determines the type of a road on which the vehicle is traveling (hereinafter, the road on which the vehicle is traveling may be referred to as "a vehicle traveling road") based on the current position of the vehicle and the map information; a white-line pattern detection process that detects the white-line pattern in the lane marking drawn on the road, using the rear camera 19; a second road type determination process that determines the type of the vehicle traveling road based on the detected white-line pattern and the white-line pattern identification information 32; and a road type change process that changes the type of the vehicle traveling road determined by the first road type determination process, based on the result of the determination performed by the second road type determination process. The navigation ECU 13 includes a CPU 41 that functions as a computing device and a control device; and internal storage devices. The internal storage devices include a RAM 42 that is used as a working memory when the CPU 41 performs various computations, and that stores, for example, route data when a route is retrieved; a ROM 43 that stores, for example, programs for controls, a first road type determination process program described later (refer to FIG. 2), and a second road type determination process program described later (refer to FIG. 3); and a flash memory 44 that stores a program read out from the ROM 43.

The operating unit 14 is operated by the user when the user inputs a departure point that is the starting point of travel, and a destination that is the end point of the travel. The operating unit 14 includes a plurality of operating switches (not shown) such as various keys and buttons. On the bases of switch signals output, for example, by pressing the switches, the navigation ECU 13 executes controls to perform processes corresponding to the switch signals. The operating unit 14 may include a touch panel provided on the surface of the liquid crystal display 15.

The liquid crystal display 15 displays, for example, a map image including roads, traffic information, guidance regarding operations, a menu of operations, guidance regarding keys, the guiding route from the departure point to the destination, guidance information provided along the guiding route, news, weather report, time, mail, and a television program. The map image is displayed in a manner such that the user can determine the road on which the vehicle is currently traveling.

The speaker 16 outputs voice guidance to guide the vehicle along the guiding route based on an instruction provided by the navigation ECU 13, and provides traffic information.

The DVD drive 17 is a drive that reads data stored in the storage medium such as a DVD and a CD. For example, the map information database 31 is updated based on the read data.

The communication module 18 is a communication device that receives traffic information transmitted from a traffic information center such as Vehicle Information and Communication System® (VICS) center and a probe center. The traffic information includes, for example, information regarding traffic congestion, information regarding traffic restriction, and information regarding a traffic accident. For example, the communication module 18 is a mobile phone or a Data Communication Module (DCM).

The rear camera 19 uses a solid-state imaging device such as a Charge Coupled Device (CCD). The rear camera 19 is attached to the vehicle at a position above a number plate fitted to the rear portion of the vehicle, and near the center of the number plate. The rear camera 19 is disposed in a manner such that an optical axis is inclined downward at a predetermined angle with respect to a horizontal plane. When the vehicle is traveling, the rear camera 19 captures the image of an area behind the vehicle, and detects the white-line pattern in the lane marking. The lane marking is a marking formed on a road surface near the vehicle to separate the traffic lanes. Then, the type of the vehicle traveling road is determined based on the detected white-line pattern in the lane marking.

More specifically, the length of the white line for an expressway and the length of the blank between the white lines for an expressway differ from those for a road other than an expressway (for example, for an ordinary road) as shown in FIG. 6. Thus, it is determined whether the vehicle traveling road is an expressway or a road other than an expressway, by detecting the sum of the length of the white line and the length of the blank adjacent to the white line in the direction in which the vehicle is traveling (hereinafter, the sum will be referred to as "a white-line pitch"), using the rear camera 19. Thus, even when the vehicle is traveling in a region in which, for example, an elevated expressway is located above an ordinary road or an elevated ordinary road is located above an expressway, or an expressway extends in parallel with an ordinary road, it is possible to accurately determine on which of an expressway and an ordinary road the vehicle is traveling.

Figure 2:
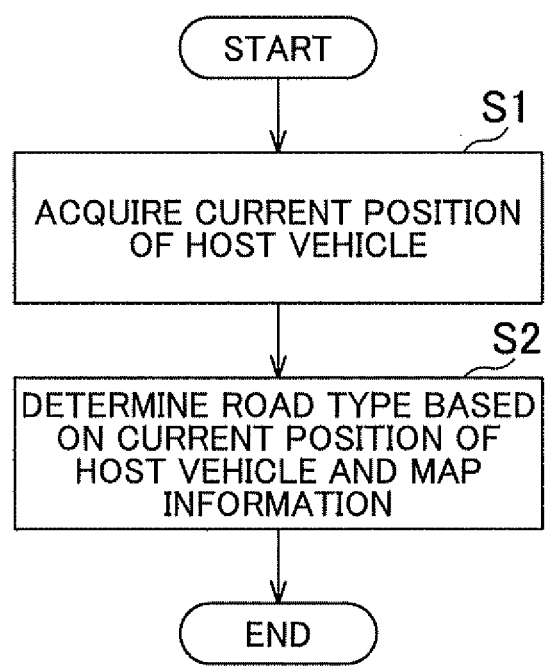
FIG. 2 is a flowchart showing a first road type determination process program according to the embodiment.
Figure 3:
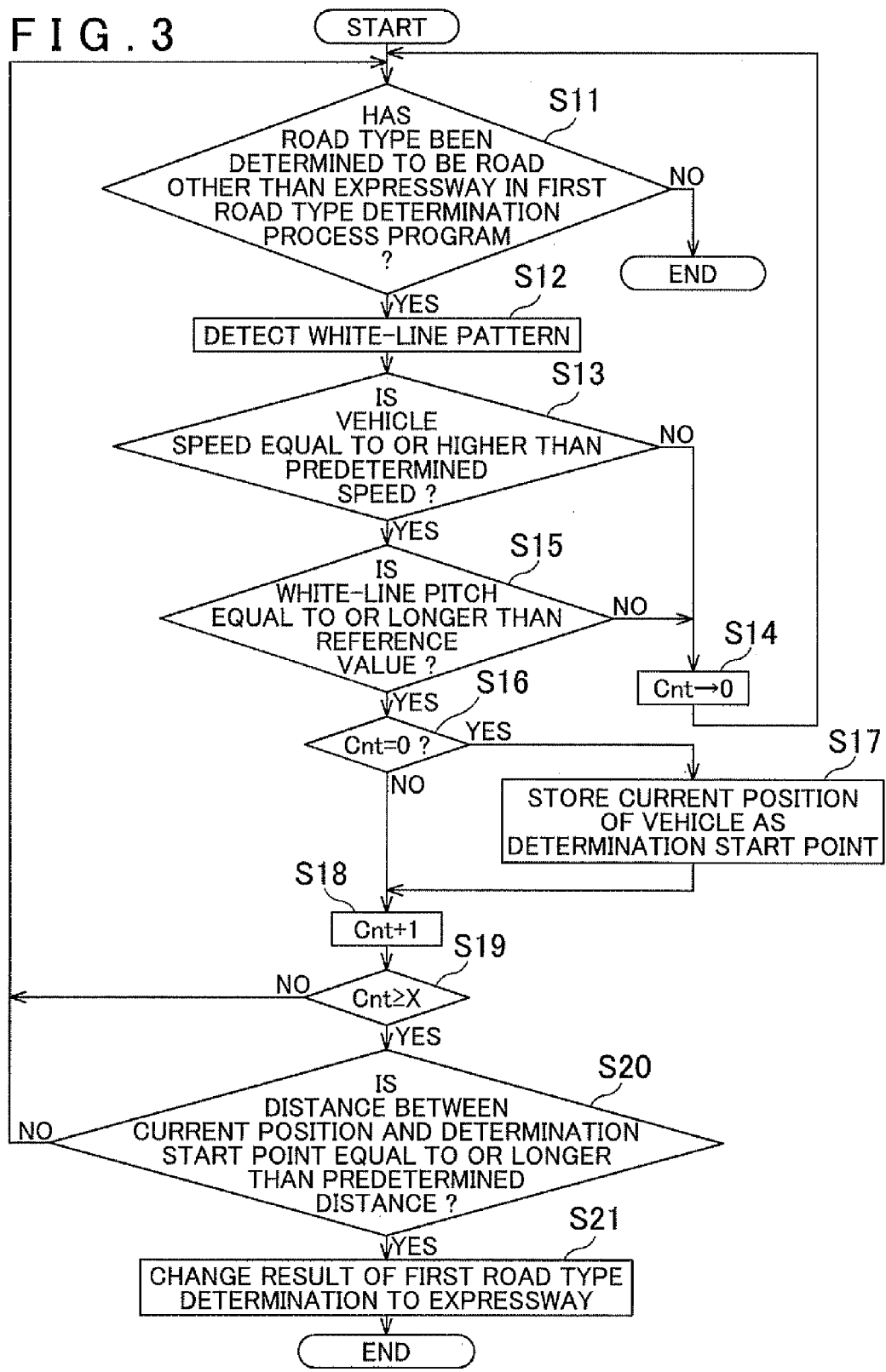
FIG. 3 is a flowchart showing a second road type determination process program according to the embodiment.

Next, the first road type determination process program executed in the navigation apparatus 1 with the above-described configuration will be described with reference to FIG. 2. FIG. 2 is a flowchart showing the first road type determination process program according to the embodiment. After an accessory switch (ACC) of the vehicle is turned on, the first road type determination process program is executed to determine the type of the vehicle traveling road, based on the current position of the vehicle and the map information. The programs shown by the flowcharts in FIG. 2 and FIG. 3 are stored in, for example, the RAM 42 or the ROM 43 of the navigation ECU 13, and executed by the CPU 41.

In the first road type determination process program, first, in step (hereinafter, abbreviated to "S") 1, the CPU 41 acquires the current position of the host vehicle. More specifically, the CPU 41 acquires information regarding the current position, current orientation, and the like of the host vehicle, based on the results of detection performed by the GPS 21 and the gyro sensor 24.

Next, in S2, the CPU 41 determines the type of the road on which the host vehicle is currently traveling (i.e., the type of the vehicle traveling road), based on the current position of the host vehicle acquired in S1, and the map information stored in the map information database 31. More specifically, the CPU 41 performs a map-matching process that determines the current position of the host vehicle on the map, based on the detected current position of the host vehicle and the map information stored in the map information database 31. Thus, the CPU 41 determines the current position of the host vehicle on the map. Then, the CPU 41 acquires, from the link data, the road type of the link including the current position of the host vehicle determined by the map-matching process, and determines that the type of the vehicle traveling road is the acquired road type.

In the navigation apparatus 1, the current position of the host vehicle determined by the map-matching process in the first road type determination process program is displayed on the liquid crystal display 15 for guidance, unless the type of the road determined in S2 is changed. Also, in the navigation apparatus 1, the guiding route to the destination is set based on the current position of the host vehicle determined by the map-matching process.

Next, a second road type determination process program executed in the navigation apparatus 1 will be described with reference to FIG. 3. FIG. 3 is a flowchart showing the second road type determination process program according to the embodiment. After the ACC of the vehicle is turned on, the second road type determination process program is executed to detect the white-line pattern in the lane marking, to determine the type of the vehicle traveling road based on the detected white-line pattern and the white-line pattern identification information 32, and to change the type of the road determined in the first road type determination process program if a certain condition is satisfied.

In the second road type determination process program, first, in S11, the CPU 41 determines whether the type of the vehicle traveling road has been determined to be a road other than an expressway (for example, an ordinary tollway or an ordinary road) in the first road type determination process program. If the type of the vehicle traveling road has been determined to be a road other than an expressway in the first road type determination process program (YES in S11), the routine proceeds to S12.

If the type of the vehicle traveling road has been determined to be an expressway (for example, an automobile expressway, an urban expressway, or a freeway) in the first road type determination process program (NO in S11), the second road type determination process program ends. As a result, in the navigation apparatus 1, the current position of the host vehicle (i.e., the position on an expressway) determined based on the result of the map-matching process in the first road type determination process program is displayed on the liquid crystal display 15 for guidance without changing the determined current position of the host vehicle. Also, in the navigation apparatus 1, the guiding route to the destination is set based on the current position of the host vehicle determined based on the result of the map-matching process. In the embodiment, only when the type of vehicle traveling road has been determined to be a road other than an expressway in the first road type determination process program, processes in and after S12 (i.e., the process of detecting the white-line pattern and the process of determining the type of the road based on the white-line pattern) are performed. Therefore, it is possible to obtain the advantageous effect of reducing the processing load of the CPU.

Figure 4:
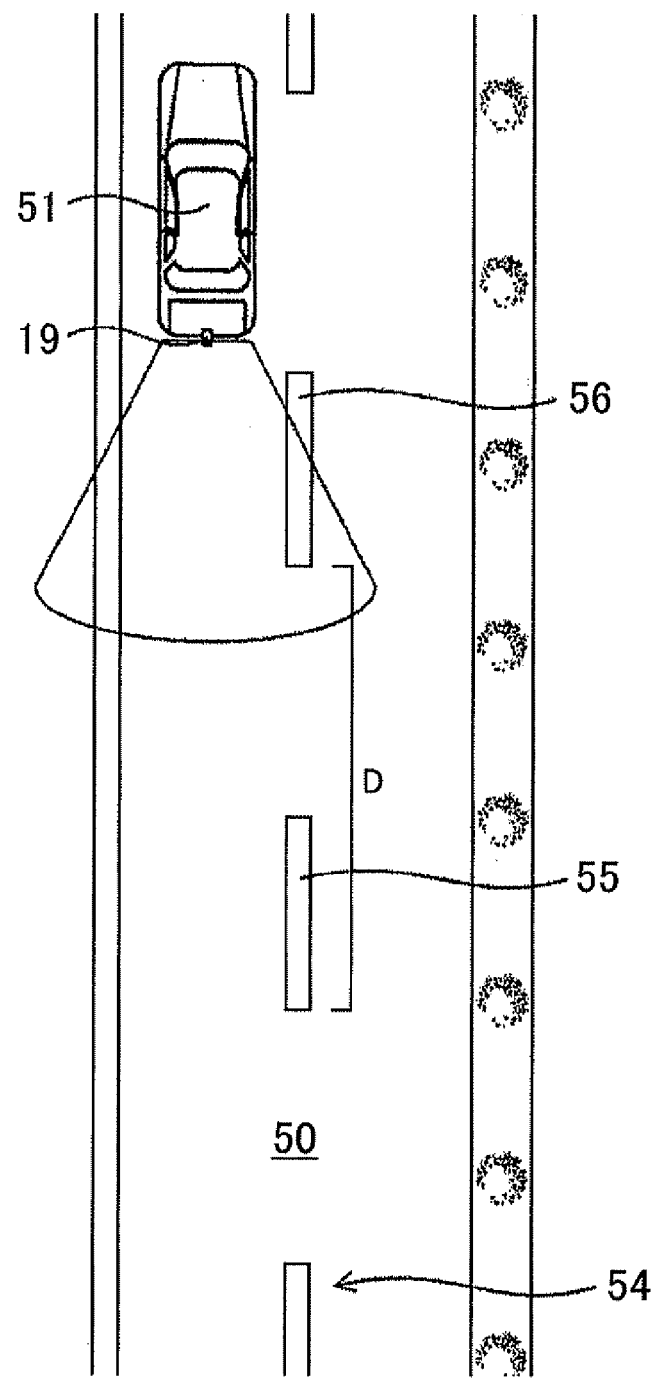
FIG. 4 is an overhead view showing a vehicle that is traveling on a road with two lanes each way.

Then, in S12, the CPU 41 detects the white-line pattern in the lane marking. More specifically, in the process in S12, first, the CPU 41 performs the process of recognizing the lane marking from the image captured by the rear camera 19, that is, the CPU 41 performs the image recognition process. Then, the CPU 41 detects the white-line pattern in the lane marking, more specifically, the sum of the length of the white line and the length of the blank adjacent to the white line in the direction in which the vehicle is traveling (that is, the CPU 41 detects the white-line pitch), based on the result of the image recognition process. FIG. 4 is an overhead view showing a host vehicle 51 that is traveling on a road 50 with two lanes each way. FIG. 5 is an image 52 captured by the rear camera 19 of the host vehicle 51 in the situation shown in FIG. 4.

The rear camera 19 is attached to the host vehicle 51 in a manner such that the optical axis is inclined downward at a predetermined angle with respect to the horizontal plane, in order to capture the image of an area behind the vehicle 51 from a position near a rear bumper 53 of the host vehicle 51. Thus, an imaging range is fixed. In the image recognition process for the lane marking, the image of the environment behind the host vehicle 51 captured by the rear camera 19 is taken into the CPU 41, and an analysis process is performed to identify a lane marking 54. In addition, a white-line pitch D of the lane marking 54 is detected. More specifically, first, the image captured by the rear camera 19 is input to the CPU 41 through analog communication such as communication using the NTSC system, or digital communication such as communication using the i-link system. Then, the input image is converted into a digital image format such as jpeg or mpeg. Then, a luminance correction process is performed on a road surface on which a marking is drawn and another road surface in the captured image based on a luminance difference, using the fact that markings including the lane marking are composed of white lines. Examples of the markings include a roadway centerline, the lane marking, a roadway edge marking, a pedestrian crosswalk line, a marking indicating that a roadway width changes, a marking indicating that an obstacle on a road is near, an on-street parking area, and a channelizing line. Then, a binarization process is performed so that a marking to be detected is separated from the image, a geometric process is performed so that distortion is corrected, and a smoothing process is performed so that noise is removed from the image. Thus, a border line between the marking and the other road surface is detected. Then, the CPU 41 determines whether the detected marking is the lane marking based on the shape of the detected marking. If the detected marking is the lane marking, the CPU 41 detects, as the white-line pitch, a distance from the front end portion of one white line to the front end portion of a next white line located ahead of the one white line in the direction in which the vehicle is traveling. In the example shown in FIG. 4 and FIG. 5, the CPU 41 detects, as the white-line pitch, a distance D from the front end portion of a white line 55 to the front end portion of a next white line 56 located ahead of the white line 55 in the direction in which the vehicle is traveling. The CPU 41 may detect, as the white-line pitch, a distance from the rear end portion of one white line to the rear end portion of a next white line located ahead of the one white line in the direction in which the vehicle is traveling. Further, the CPU 41 may detect the length of the white line and the length of the blank adjacent to the white line, and may detect the sum of the length of the white line and the length of the blank adjacent to the white line, as the white pitch.

Then, in S13, the CPU 41 detects the speed of the host vehicle using the vehicle speed sensor 22, and determines whether the detected speed of the host vehicle is equal to or higher than a predetermined speed. When the white-line pitch is detected using the rear camera 19, if the speed of the host vehicle is low, there is a possibility that the detected white-line pitch may be longer than the actual white-line pitch. Thus, in order to improve reliability of the result of the road type determination, the white-line pitch detected when the speed of the host vehicle is lower than a predetermined speed is not used for the road type determination in the embodiment. The predetermined speed used as a determination criterion in S13 is a minimum speed for accurately detecting the white-line pitch. For example, the predetermined speed is 30 km/h.

If it is determined that the speed of the host vehicle is equal to or higher than the predetermined speed in S13 (YES in S13), it is determined that the accurate white-line pitch has been detected in S12, and the routine proceeds to S15. In contrast, if it is determined that the speed of the host vehicle is lower than the predetermined speed (NO in S13), it is determined that the accurate white-line pitch has not been detected in S12, and the routine proceeds to S14.

In S14, the CPU 41 reads out a Cnt value from the RAM 42, and assigns 0 to the Cnt value, and then, stores the Cnt value in the RAM 42 again. Then, the routine returns to S11. As described later, the Cnt value indicates the number of times that the same result of the road type determination is successively obtained (for example, the determination that the road type is an expressway is successively made) based on the detected pitch, in order to improve reliability of the result of the road type determination. The Cnt value is initialized when the ACC is turned on. The initial value of the Cnt value is 0.

In S15, the CPU 41 determines whether the white-line pitch detected in S12 is equal to or longer than a reference value. In the embodiment, the reference value used as a determination criterion in S15 is 20 m that is the stipulated white-line pitch for an expressway in Japan. The reference value is acquired from the white-line pattern identification information 32 stored in the data storage unit 12 (refer to FIG. 6). Thus, it is possible to determine whether the vehicle traveling road is an expressway based on the detected white-line pitch.

If it is determined that the white-line pitch detected in S12 is equal to or longer than the reference value (YES in S15), that is, if it is determined that the road type is an expressway based on the white-line pitch, the routine proceeds to S16. In contrast, if it is determined that the white-line pitch detected in S12 is shorter than the reference value (NO in S15), that is, if it is determined that the road type is a road other than an expressway based on the white-line pitch, the routine proceeds to S14.

In S16, the CPU 41 reads out the Cnt value from the RAM 42, and determines whether the Cnt value is 0.

If it is determined that the Cnt value is 0 (YES in S16), the routine proceeds to S17. In contrast, if it is determined that the Cnt value is not 0 (NO in S16), the routine proceeds to S18.

In S17, the CPU 41 determines the current position of the host vehicle using the GPS 21, and stores the determined current position in the RAM 42 as the first point at which the determination that the road type is an expressway is made based on the white-line pitch (hereinafter, the first point will be referred to as "a determination start point"). The detailed current position of the host vehicle may be determined based on a road marking included in the image captured by the rear camera 19. A specific technique for determining the detailed current position of the host vehicle using the rear camera 19 is a known technique, and therefore, the detailed description thereof is omitted.

In S18, the CPU 41 reads out the Cnt value from the RAM 42, and adds 1 to the Cnt value, and then, stores the Cnt value to the RAM 42 again.

Then, in S19, the CPU 41 reads out the Cnt value from the RAM 42, and determines whether the Cnt value is equal to or larger than X. For example, X is 10.

If it is determined that the Cnt value is smaller than X (NO in S19), the routine returns to S11. In contrast, if it is determined that the Cnt value is equal to or larger than X (YES in S19), it is determined that the result of the road type determination obtained based on the white-line pitch (that is, the determination that the road type is an expressway made based on the white-line pitch) is reliable, because the same result of the road type determination has been obtained based on the white-line pitch X times or more successively. Then, the routine proceeds to S20.

In S20, the CPU 41 determines the current position of the host vehicle using the GPS 21 and the rear camera 19. Then, the CPU 41 determines whether a distance between the current position of the host vehicle and the determination start point stored in the RAM 42 in S17 is equal to or longer than a predetermined distance (for example, whether the distance is equal to or longer than a distance (40 m) equal to two stipulated white-line pitches for an expressway). The predetermined distance may be a distance equal to or longer than three stipulated white-line pitches for an expressway (i.e., a distance equal to or longer than 60 m).

If it is determined that the distance between the current position of the host vehicle and the determination start point stored in the RAM 42 in S17 is shorter than the predetermined distance (NO in S20), the routine returns to S11. In contrast, if it is determined that the distance between the current position of the host vehicle and the determination start point stored in the RAM 42 in S17 is equal to or longer than the predetermined distance (YES in S20), it is determined that the result of the road type determination obtained based on the white-line pitch (that is, the determination that the road type is an expressway made based on the white-line pitch) is reliable, because the same result of the road type determination has been successively obtained based on the white-line pitch while the white-line pattern in the lane marking with a length equal to or longer than the predetermined distance has been detected. Thus, the routine proceeds to S21.

In S21, the CPU 41 determines that the type of the road on which the host vehicle is actually and currently traveling (i.e., the vehicle traveling road) is an expressway, and changes the type of the vehicle traveling road determined in the first road type determination process program from a road other than an expressway to an expressway. Accordingly, in the navigation apparatus 1, the current position of the host vehicle determined based on the result of the map-matching process in the first road type determination process program is changed to a position on an expressway. Then, the changed current position of the host vehicle is displayed on the liquid crystal display 15 for guidance. Also, the guiding route to the destination is set based on the changed current position of the host vehicle.

As described above in detail, in the navigation apparatus 1 according to the embodiment, the travel guiding method for a vehicle performed by the navigation apparatus 1, and A computer-readable storage medium that stores computer-executable instructions for performing the method executed by the navigation apparatus 1, the type of the vehicle traveling road is determined based on the current position of the vehicle and the map information by the first road type determination (S2). In addition, if it is determined that the type of the vehicle traveling road is a road other than an expressway by the first road type determination, the white-line pattern drawn on the vehicle traveling road is detected using the rear camera 19 (S12), and the type of the vehicle traveling road is determined based on the detected white-line pattern and the white-line pattern identification information 32, by the second road type determination (S12 to S20). If it is determined that the type of the vehicle traveling road is an expressway by the second road type determination, the type of the vehicle traveling road determined by the first road type determination is changed from a road other than an expressway to an expressway (S21). Therefore, it is possible to reduce the possibility that an erroneous determination that the vehicle is traveling on a road other than an expressway is made although the vehicle is traveling on an expressway. In addition, it is possible to change the result of the determination as to the type of the vehicle traveling road to the accurate determination result, based on the detected white-line pattern. Accordingly, it is possible to improve the reliability of the result of the road type determination.

Also, if the same result of the second road type determination is successively obtained while the white-line pattern in the lane marking equal to or longer than the predetermined distance is detected, the result of the first road type determination is changed. Therefore, it is possible to improve the reliability of the result of the road type determination.

Further, because the white-line pattern detected when the speed of the vehicle is lower than the predetermined speed is not used for the road type determination, it is possible to improve the reliability of the result of the road type determination.

It is to be understood that the invention is not limited to the above-described embodiment, and various modifications and changes may be made without departing from the invention. For example, although the white lines are used as the marker indicating the border between the lanes in the embodiment, another marker may be used as long as the pattern of the marker for an expressway is different from the pattern of the marker for a road other than an expressway. Also, although the sum of the length of the white line and the length of the blank adjacent to the white line (i.e., the white-line pitch) is detected as the white-line pattern, and the road type is determined using the detected white-line pitch in the embodiment, the length of the white line or the length of the blank between the white lines may be detected as the white-line pattern. As shown in FIG. 6, the stipulated length of the white line for an expressway is different from that for a road other than an expressway, and the stipulated length of the blank between the white lines for an expressway is different from that for a road other than an expressway. Therefore, it is possible to determine the road type based on the length of the white line or the length of the blank between the white lines.

The white-line pattern may be determined based on an image captured by a front camera disposed at the front portion of the vehicle, or an image captured by a camera disposed at the side portion of the vehicle, in addition to or instead of the image captured by the rear camera 19 disposed at the rear portion of the vehicle.

The reference value, which is the determination criterion used in S15, may be a value (for example, 18 m) shorter than the stipulated white-line pitch for an expressway. However, in this case, the reference value needs to be longer than a value (for example, 17 m) set by adding a recognition error of the camera to the white-line pitch (15 m) for a road other than an expressway. Also, a certain reference value range (for example, the range of 18 m to 22 m) may be set, and it may be determined whether the white-line pitch detected in S15 is in the reference value range. In this case as well, the lower limit value in the reference value range needs to be longer than the value set by adding the recognition error of the camera to the white-line pitch for a road other than an expressway.

What is claimed is:

1. A travel guiding apparatus for a vehicle, comprising:
   a non-transitory memory that stores:
      map information; and
      marker pattern identification information used to identify a marker pattern for each road type, the marker pattern identification information indicating a pattern of a marker included in a lane marking; and
   a controller that:
      makes a first determination of a road type of a road on which the vehicle is traveling based on a current position of the vehicle and the stored map information;
      detects the maker pattern on the traveled road;
      makes a second determination of the road type of the traveled road based on the detected marker pattern and the stored marker pattern identification information;
      changes the first determined road type from a road other than an expressway to an expressway when the first determined road type is a road other than an expressway, and the second determined road type is an expressway; and
      does not change the first determined road type from a road other than an expressway to an expressway based on the second determined road type when the first determined road type is an expressway.

2. The travel guiding apparatus for a vehicle according to claim 1, wherein the controller:
   changes the first determined road type when:
      the second determined road type is determined to be an expressway a predetermined number of times successively, and
      the detected marker pattern has a length equal to or longer than a predetermined distance.

3. The travel guiding apparatus for a vehicle according to claim 1, wherein the controller:
   detects a speed of the vehicle; and
   makes the second determination of the road type when the speed of the vehicle is equal to or higher than a predetermined speed.

4. The travel guiding apparatus for a vehicle according to claim 1, wherein
   the marker is composed of a white line drawn on a road.

5. The travel guiding apparatus for a vehicle according to claim 4, wherein the marker pattern is one of a length of the white line, a length of a blank between the white lines, and a sum of the length of the white line and the length of the blank adjacent to the white line.

6. A travel guiding method for a vehicle, comprising:
  accessing a memory storing:
    map information; and
    marker pattern identification information used to identify a marker pattern for each road type, the marker pattern identification information indicating a pattern of a marker included in a lane marking;
  performing, with a controller, a first road type determination of a road type of a road on which the vehicle is traveling based on a current position of the vehicle and the accessed map information;
  detecting, with the controller, the maker pattern on the traveled road;
  performing, with the controller, a second determination of the road type of the traveled road based on the detected marker pattern and the accessed marker pattern identification information;
  changing, with the controller, the first determined road type from a road other than an expressway to an expressway when the first determined road type is a road other than an expressway and the second determined road type is an expressway; and
  not changing the first determined road type from a road other than an expressway to an expressway based on the second determined road type when the first determined road type is an expressway.

7. A non-transitory computer readable storage device that stores computer-executable instructions for performing a travel guiding method for a vehicle comprising:
  accessing a memory storing:
    map information; and
    marker pattern identification information used to identify a marker pattern for each road type, the marker pattern identification information indicating a pattern of a marker included in a lane marking;
  performing, with a controller, a first road type determination of a road type of a road on which the vehicle is traveling based on a current position of the vehicle and the accessed map information;
  detecting, with the controller, the maker pattern on the traveled road;
  performing, with the controller, a second determination of the road type of the traveled road based on the detected marker pattern and the accessed marker pattern identification information;
  changing, with the controller, the first determined road type from a road other than an expressway to an expressway when the first determined road type is a road other than an expressway and the second determined road type is an expressway; and
  not changing the first determined road type from a road other than an expressway to an expressway based on the second determined road type when the first determined road type is an expressway.

* * * * *